US011363036B2

(12) United States Patent
Levin et al.

(10) Patent No.: US 11,363,036 B2
(45) Date of Patent: Jun. 14, 2022

(54) DETECTING A MISSING SECURITY ALERT USING A MACHINE LEARNING MODEL

(71) Applicant: Microsoft Technology Licensing, LLC, Redmond, WA (US)

(72) Inventors: Roy Levin, Haifa (IL); Mathias A. M. Scherman, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 323 days.

(21) Appl. No.: 16/368,704

(22) Filed: Mar. 28, 2019

(65) Prior Publication Data

US 2020/0314118 A1 Oct. 1, 2020

(51) Int. Cl.
*H04L 9/40* (2022.01)

(52) U.S. Cl.
CPC ...... *H04L 63/1416* (2013.01); *H04L 63/1466* (2013.01)

(58) Field of Classification Search
CPC ............. H04L 63/1416; H04L 63/1466; H04L 63/1425; G06F 21/552
USPC ........................................................ 726/22
See application file for complete search history.

(56) References Cited

U.S. PATENT DOCUMENTS

| 8,418,249 | B1 * | 4/2013 | Nucci ................... | G06F 21/552 709/225 |
| 9,654,485 | B1 * | 5/2017 | Neumann ........... | H04L 63/1416 |
| 9,800,605 | B2 * | 10/2017 | Baikalov ............. | H04L 63/1433 |
| 10,091,229 | B2 * | 10/2018 | Stute .................... | H04L 63/1433 |
| 10,104,102 | B1 * | 10/2018 | Neumann ........... | H04L 63/1441 |
| 10,715,679 | B1 * | 7/2020 | Balakrishnan ........ | H04M 15/60 |
| 2002/0082886 | A1 * | 6/2002 | Manganaris .......... | G06F 21/552 719/318 |
| 2006/0149990 | A1 * | 7/2006 | S. ............................ | H04L 1/22 714/1 |
| 2013/0117852 | A1 * | 5/2013 | Stute ...................... | G06F 21/55 726/23 |
| 2013/0145461 | A1 * | 6/2013 | Barton .................. | H04W 12/12 726/22 |
| 2014/0215606 | A1 * | 7/2014 | Flowers ................. | H04L 69/22 726/22 |

(Continued)

OTHER PUBLICATIONS

"International Search Report and Written Opinion Issued in PCT Application No. PCT/US2020/019837", dated May 13, 2020, 24 Pages.

*Primary Examiner* — Badri Narayanan Champakesan
(74) *Attorney, Agent, or Firm* — Fiala & Weaver P.L.L.C.

(57) ABSTRACT

Methods, systems, and apparatuses are provided for detecting a missing security alert by receiving an alert sequence generated by a network security provider, applying the received alert sequence to a security incident model, receiving an indication from the security incident model that the received alert sequence corresponds to a security incident defined by a predetermined sequence of alerts that includes at least one alert missing from the received alert sequence, and generating a notification to the network security provider that indicates at least one of the security incident or the missing alert(s). In addition, the security incident model may be generated by providing a set of historical alerts and a set of historical security incidents to a machine learning algorithm to generate the security incident model.

20 Claims, 6 Drawing Sheets

(56) References Cited

U.S. PATENT DOCUMENTS

| | | | | |
|---|---|---|---|---|
| 2015/0128274 A1* | 5/2015 | Giokas | ............... | H04L 51/12 |
| | | | | 726/23 |
| 2016/0103992 A1* | 4/2016 | Roundy | ............... | G06F 21/554 |
| | | | | 726/23 |
| 2016/0156656 A1* | 6/2016 | Boggs | ............... | H04L 9/08 |
| | | | | 726/25 |
| 2017/0063911 A1* | 3/2017 | Muddu | ............... | H04L 43/00 |
| 2018/0004942 A1* | 1/2018 | Martin | ............... | G06F 21/554 |
| 2018/0089014 A1* | 3/2018 | Smith | ............... | G06F 11/0757 |
| 2018/0255078 A1* | 9/2018 | Papillon | ............... | H04L 63/1416 |
| 2018/0255080 A1* | 9/2018 | Paine | ............... | G06F 21/57 |
| 2019/0165989 A1* | 5/2019 | Jacobs | ............... | G05B 23/0272 |
| 2020/0412445 A1* | 12/2020 | Okino | ............... | H04B 10/0775 |

* cited by examiner

500

600

700

DETECTING A MISSING SECURITY ALERT USING A MACHINE LEARNING MODEL

BACKGROUND

Cloud computing is a form of network-accessible computing that provides shared computer processing resources and data to computers and other devices on demand over the Internet. Cloud computing enables the on-demand access to a shared pool of configurable computing resources, such as computer networks, servers, storage, applications, and services. Given the vast resources available on the cloud, cloud workload security has become increasingly important.

To combat security issues, cloud security providers offer services with threat detection capabilities to alert customers to malicious activity targeting their environments. As in conventional computer systems, cloud computing systems may generate several alerts related to a single attack campaign. Many attacks follow a common sequence of steps to achieve some nefarious objective. Such attacks are often referred to as a kill-chain.

To render a collection of alerts meaningful to a system administrator, a cloud security provider may aggregate alerts that align with a kill-chain pattern into an "incident" to provide a consolidated view of the attack campaign. Typically, an incident includes a sequence of alerts, where each alert corresponds to a particular step in a kill-chain. These alerts contain valuable information helpful in determining what triggered the alert, the resources targeted, and the source of the attack.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for detecting a missing security alert in a security incident using a machine learning model. For example, the methods, systems, and computer program described herein may receive an alert sequence generated by a network security provider and apply the received alert sequence to a security incident model. An indication may be received from the security incident model that the received alert sequence corresponds to a security incident defined by a predetermined sequence of alerts that includes at least one alert missing from the received alert sequence. A notification may be generated for sending to the network security provider that indicates the security incident and/or the at least one missing alert. The system may also receive a similarity score from the security incident model that indicates an amount of similarity between the received alert sequence and the security incident. In addition, the system may generate the security incident model, such as by providing a set of historical alerts and a set of historical security incidents to a machine learning algorithm, or in another manner.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
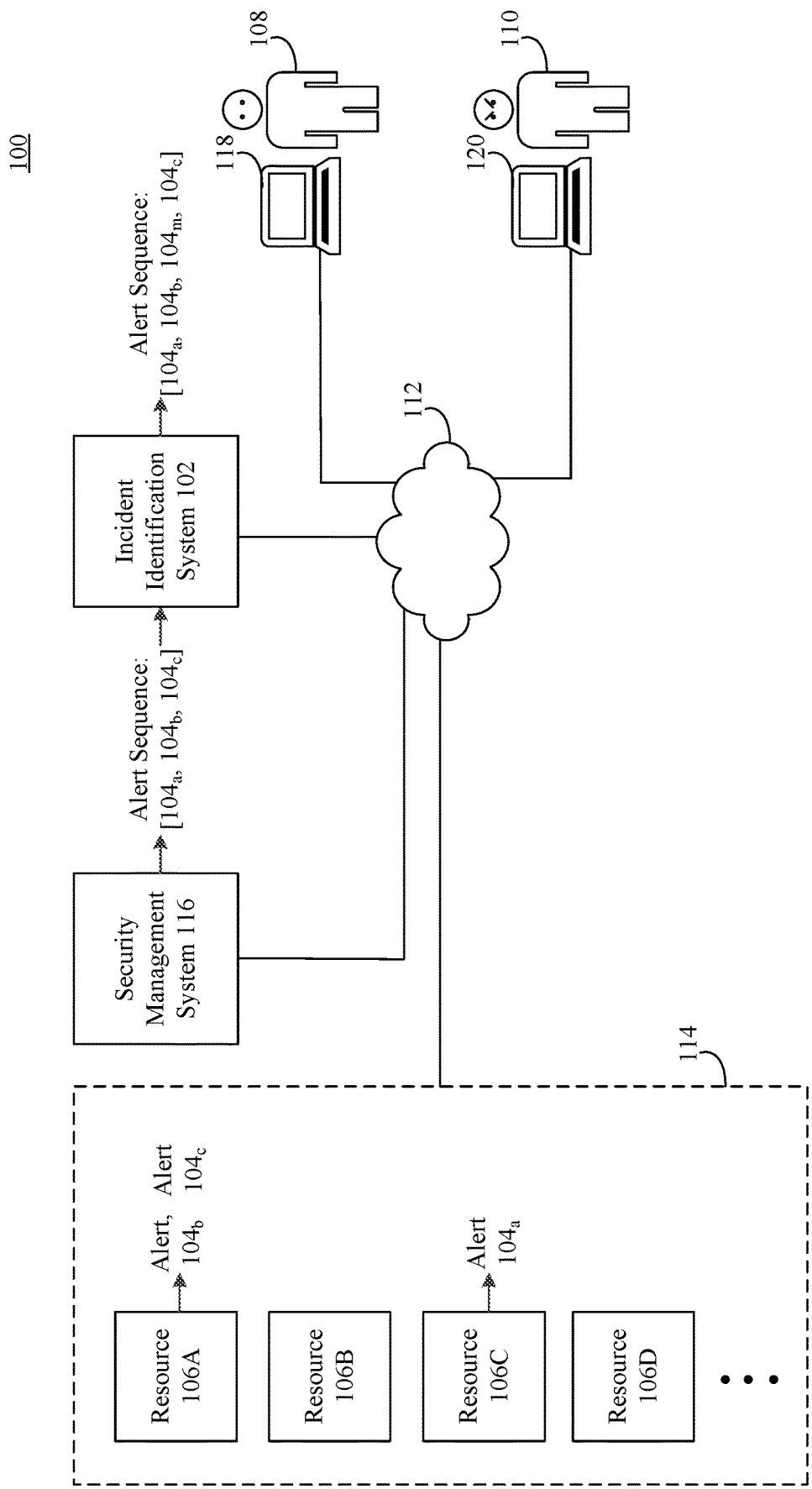
FIG. 1 shows a block diagram of a system configured to collect a sequence of alerts generated by resources of an environment and determine if the sequence of alerts corresponds to a security incident defined by a predetermined sequence of alerts, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud computing is a form of network-accessible computing that provides shared computer processing resources and data to computers and other devices on demand over the Internet. Cloud computing enables the on-demand access to a shared pool of configurable computing resources, such as computer networks, servers, storage, applications, and services. Given the vast resources available on the cloud, cloud workload security has become increasingly important.

To combat security issues, cloud security providers offer services with threat detection capabilities to alert customers to malicious activity targeting their environments. As in conventional computer systems, cloud computing systems may generate several alerts related to a single attack campaign. Many attacks follow a common sequence of steps to achieve some nefarious objective. Such attacks are often referred to as a kill-chain.

To render a collection of alerts meaningful to a system administrator, a cloud security provider aggregates any alerts that align with a kill-chain pattern into an "incident" to provide a consolidated view of the attack campaign. Typically, an incident includes a sequence of alerts, where each alert corresponds to a particular step in a kill-chain. These alerts contain valuable information helpful in determining what triggered the alert, the resources targeted, and the source of the attack.

However, in some instances, a malicious event in an attack series may not be detected and thereby an alert corresponding to the malicious event may not be triggered. If an alert is missing from a sequence of issued alerts, then the appropriate incident associated with the attack series may not be designated and provided to a system administrator. For example, an attacker may move laterally from a compromised resource to another resource within a same network to harvest valuable data. If the lateral move to the other resource is not detected, then an alert indicating that the other resource is comprised will not be included in the reported incident and a system administrator will be unaware of the comprised resource and unable to remediate the attack. Current threat detection techniques are not necessarily foolproof and can at times miss malicious activity targeting resources.

Embodiments disclosed herein overcome these issues by taking into account that attackers often use the same attack sequence. Accordingly, in embodiments enable missing steps in an attack sequence to be determined, which can be used to determine the presence of an incident that was not already determined to have occurred.

For example, in one embodiment, an alert sequence generated by a network security provider is received. The received alert sequence is provided to a security incident model. An indication is received from the security incident model that the received alert sequence corresponds to a security incident defined by a predetermined sequence of alerts that includes at least one alert missing from the received alert sequence. A notification is generated to the network security provider that indicates at least one of the security incident or the missing alert(s). Embodiments disclosed herein also address these issues by a similarity score being obtained from the security incident model that indicates an amount of similarity between the received alert sequence and the security incident. Furthermore, a set of historical alerts and a set of historical security incidents may be input to a machine learning algorithm to generate the security incident model.

In embodiments, systems may be configured in various ways to determine security incidents from received alert sequences. For instance, FIG. 1 shows a block diagram of an example security incident determination system 100, according to an example embodiment. As shown in FIG. 1, system 100 is implemented with respect to an environment 114 that includes any number of resources (e.g., resources 106A, 106B, 106C, 106D) that a user 108 is authorized to access and an attacker 110 is not authorized to access, a security management system 116, and an incident identification system 102. System 100 is described in further detail as follows.

As shown in FIG. 1, resources of environment 114, security management system 116, and incident identification system 102 are communicatively coupled via a network 112. Resources of environment 114 are also communicatively coupled with each other via network 112. Network 112 may comprise one or more networks such as local area networks (LANs), wide area networks (WANs), enterprise networks, the Internet, etc., and may include one or more of wired and/or wireless portions.

For illustration purposes, environment 114 is shown to include resources 106A, 106B, 106C, and 106D, but may include any number of resources, including tens, hundreds, thousands, millions, and even greater numbers of resources. Environment 114 may be comprised of resources (e.g., servers) running on different clouds and/or in on-premises data centers of an enterprise or organization associated with a user 108. Resources 106A, 106B, 106C, and 106D may include any of the following example cloud computing resources of computer networks, servers, storage, applications, or services, and/or may include further types of resources. For example, in an embodiment, resources 106A, 106B, 106C, and 106D may each be a server and form a network-accessible server set that are each accessible by a network such as the Internet (e.g., in a "cloud-based" embodiment) to store, manage, and process data. Additionally, in an embodiment, environment 114 may include any type and number of other resources including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of a multi-tenant cloud, etc.), and/or further types of resources.

In an embodiment, resources 106A, 106B, 106C, and 106D may be configured to execute one or more services (including microservices), applications, and/or supporting services. A "supporting service" is a cloud computing service/application configured to manage a set of servers to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Resources 106A, 106B, 106C, and 106D may be configured to execute any number of supporting services, including multiple instances of the same and/or different supporting services.

User 108 and any number of further users (e.g., individual users, family users, enterprise users, governmental users, etc.) may access resources 106A, 106B, 106C, and 106D and any other resources of environment 114 through network 112 via computing devices, including a computing device 118 accessed by user 108. These computing devices used to access resources of environment 114 may be any type of a stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 118 of user 108 may interface with resources 106A, 106B, 106C, and 106D through application programming interfaces (APIs) and/or by other mechanisms. Note that any number of program interfaces may be present.

Though security management system 116 and incident identification system 102 are shown separate from resources 106A, 106B, 106C, and 106D, in an embodiment, security management system 116 and incident identification system 102 may be incorporated in one or more resources of environment 114. Security management system 116 and incident identification system 102 may also be incorporated in any type of stationary or mobile computing device(s) described elsewhere herein or otherwise known. For instance, security management system 116 and incident identification system 102 may be incorporated in a network/cloud supporting service mentioned elsewhere herein or otherwise known.

Security management system 116 may be configured to manage and/or monitor the security of resources 106A-106D and any other resources in environment 114. For example, attacker 110 may attempt to access resources 106A, 106B, 106C, and 106D via network 112 for an unauthorized purpose using any type of stationary or mobile computing device similar to computing devices used by user 108, such as a computing device 120. In some instances, attacker 110 may try to execute malicious software (e.g., malware) on a resource, attempt a brute-force attack (e.g., password guessing) on a resource, persist in a compromised network to access valuable data and/or use a comprised resource to mount attacks against other resources in an environment.

If such attacks by attacker 110 occur, resources 106A, 106B, 106C, and 106D may generate an alert indicating that a perceived threat has been detected. For instance, as shown in FIG. 1, resources 106A and 106C generate alerts $104_a$, $104_b$, and $104_c$. These alerts may be generated following unauthorized or illegitimate attempts perpetrated by attacker 110 to access resources 106A and 106C. After being generated, in an embodiment, alert $104_a$ may be stored in a log file maintained by resource 106C and alerts $104_b$ and $104_c$ may be stored in a log file maintained by resource 106A. A monitoring agent associated with security management system 116 may be installed on each of resources 106A, 106B, 106C, and 106D and configured to collect events (such as alerts $104_a$, $104_b$, and $104_c$) from log files, performance data, and other telemetry from the resources and send the collected information to security management system 116 via network 112.

Alerts $104_a$, $104_b$, and $104_c$ may comprise any type of security alert, including but not limited to a potential virus alert, web application firewall alert, endpoint data protection alert, etc. Similarly, alerts $104_a$, $104_b$, and $104_c$ are not limited to security alerts generated in cloud computing systems described herein as exemplary embodiments. Alert evaluating system 108 may also operate on one or more standalone devices connected to a network in which security alerts are generated.

Alerts $104_a$, $104_b$, and $104_c$ may include contextual information, such as a username, process name, IP address, etc., associated with a resource and/or application that the alert was generated based upon. Alerts $104_a$, $104_b$, and $104_c$ may also include contextual information regarding any relationship the alert may have to another one or more alerts, such as temporal connections. Alerts $104_a$, $104_b$, and $104_c$ may be individual alerts, groups of alerts, logs of alerts, or chains of alerts that may together resemble a potential threat.

Security management system 116 is further configured to correlate and analyze the collected information described above to enable real-time reporting and alerting on incidents that may require intervention. For example, security management system 116 may receive, via network 112, alert $104_a$ from resource 106C and alerts $104_b$ and $104_c$ from resource 106A that warn of threats posed to the resources. Security management system 116 may further analyze alerts $104_a$, $104_b$, and $104_c$ and generate a security incident based on the analysis of the alerts. More specifically, security management system 116 may correlate information associated with alerts $104_a$, $104_b$, and $104_c$ and deduce that the alerts are part of the same security incident, which comprises a sequence of alerts of [$104_a$, $104_b$, $104_c$], based on temporal relationships and/or contextual information (e.g., a username, process name, IP address, etc.) associated with each alert.

Additionally, security management system 116 may analyze a history of alerts existing on a cloud service, such as alert logs generated by individual computing devices and/or servers connected to a cloud or environment 114 or through logs aggregating a history of alerts across multiple computing devices and/or servers connected to the cloud or environment 114. The historical alerts may then be grouped together to form incidents based on a preexisting relationship, such as a timing relationship and/or whether the alert occurred on the same or similar resources.

Incident identification system 102 is configured to receive an alert sequence, determine if the received alert sequence corresponds to a security incident defined by a predetermined sequence of alerts, and generate a corresponding notification. The predetermined sequence of alerts may be a pattern of alerts previously detected by a cloud provider and verified to correspond to steps in an attack campaign. In an embodiment, incident identification system 102 may receive an alert sequence identified by security management system 116 as a security incident via network 112. Alternatively, or in addition to, incident identification system 102 may receive one or more alerts directly from resources 106A, 106B, 106C, and 106D via network 112.

For example, as depicted in FIG. 1, incident identification system 102 receives an alert sequence of [$104_a$, $104_b$, $104_c$] from security management system 116 and generates a notification indicating that the received alert sequence corresponds to a security incident including alert sequence of [$104_a$, $104_b$, $104_m$, $104_c$]. The indicated security incident includes alert $104_m$ which is not included in the received alert sequence. As previously described, a security incident may include a sequence of alerts, where each alert corresponds to a step in an attack campaign. Say for illustration purposes, a malicious event committed by attacker 110 corresponding to alert $104_m$ was not detected, resulting in alert $104_m$ not to be generated. The notification indicating that the alert sequence corresponds to the security incident including the alert sequence of [$104_a$, $104_b$, $104_m$, $104_c$] could be provided to user 108—informing the user of the previously unnoticed malicious event corresponding to alert $104_m$ and allowing user 108 to investigate the attack and remediate any harm caused by the malicious event.

To provide real-world context, say attacker 110 first tries to unsuccessfully access resource 106C by submitting several possible passwords for an account associated with user 108, and resource 106C then generates alert $104_a$ indicating that a brute force attempt was found. Next, attacker 110 successfully accesses resource 106A by submitting a correct password for an account associated with user 108, and resource 106A generates alert $104_b$ indicating that a successful brute force attack was found. Attacker 110 then executes malicious code on resource 106A without detection by masquerading it as a benign process. If the event had been detected, alert $104_m$ would have been generated by resource 106A indicating that a malicious process was created. Finally, attacker 110 uses resource 106A to try again to access resource 106C by submitting several possible passwords for an account associated with user 108 and resource 106A then generates alert $104_c$ indicating an outgoing brute force attempt was found. Because alert $104_m$ was not generated, user 108 is unaware that the malicious code is executing on resource 106A. This scenario, however, is preventable.

Because attackers often employ a common pattern of attack, it is possible to predict steps of an attack campaign. For example, by embodiments described herein determining a generated alert sequence corresponds to a previously seen and vetted security incident, an incomplete alert sequence can be flagged, and users and/or system administrators can be made aware of any missing alerts associated with an undetected event. Moreover, embodiments described herein can provide users and/or system administrators with information associated with missing alerts that may be critical to an investigation of an attack campaign and that can help identify vulnerabilities in a threat detection solution offered by a cloud provider. Embodiments described herein also act as a second line of defense for resources of the environment, as threat detection systems are not necessarily foolproof and can at times miss malicious activity targeting resources.

Figure 2:
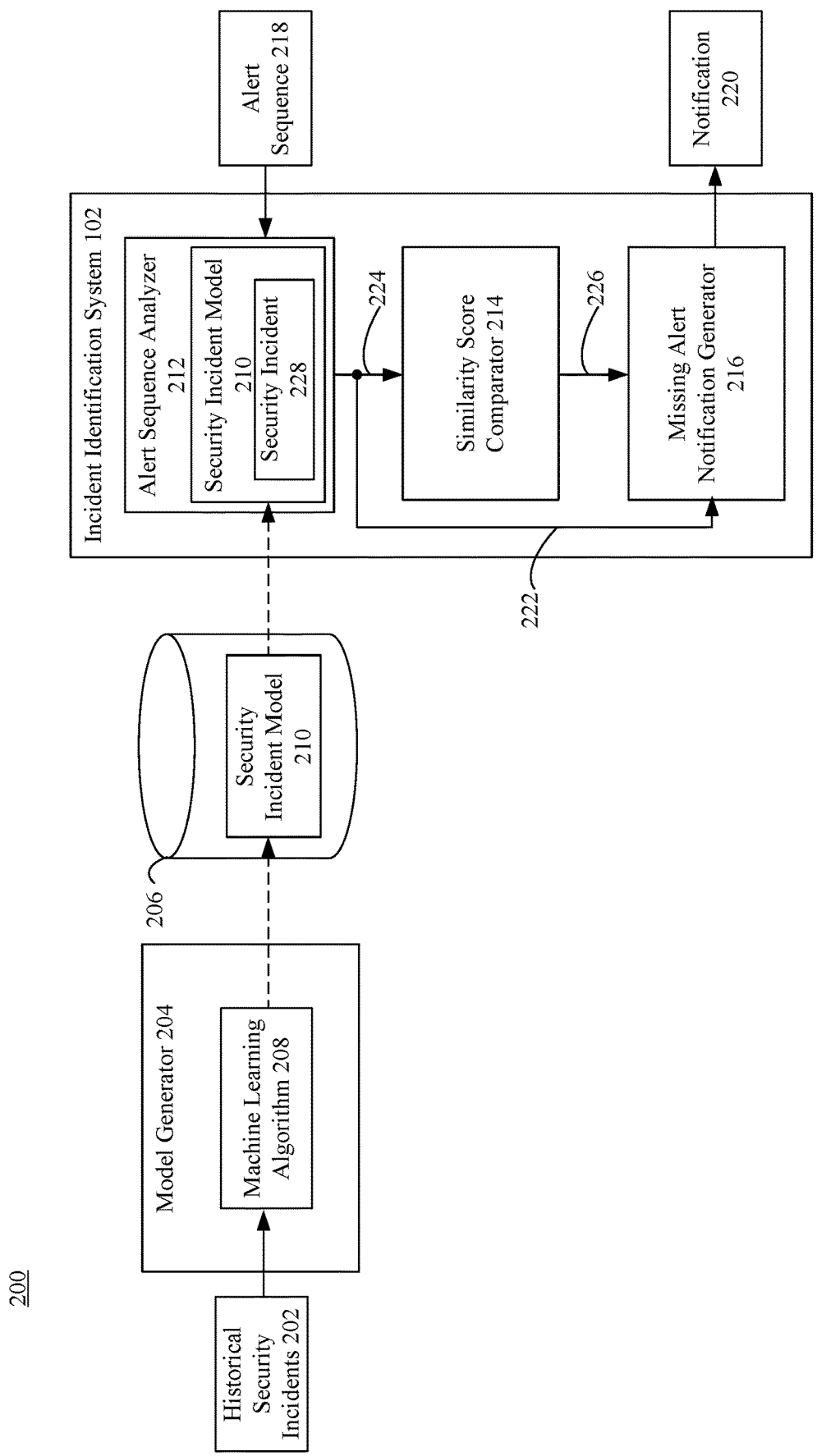
FIG. 2 shows a block diagram of a system configured to generate a security incident model and configured to use the security incident model to identify a security incident that corresponds to a received alert sequence, according to an example embodiment.

The process described with reference to FIG. 1 will now be described in more detail with reference to FIG. 2. Note that incident identification system 102 of FIG. 1 may be implemented in various ways to perform its functions. For instance, FIG. 2 is a block diagram for a system 200 that generates a security incident model and uses the security incident model to identify a security incident that corresponds to a received alert sequence, where the security incident includes at least one alert missing from the received alert sequence, in accordance with an example embodiment. As shown in FIG. 2, system 200 includes a model generator 204 and incident identification system 102. As further shown in FIG. 2, incident identification system 102 includes an alert sequence analyzer 212, a similarity score comparator 214, and a missing alert notification generator 216. System 200 is described in further detail as follows.

Model generator 204 is configured to generate a security incident model 210 used to identify a security incident that corresponds to a received alert sequence and store the generated security incident model 210 in a storage 206. Storage 206 may include one or more of any type of suitable storage medium, such as a hard disk, solid-state drive, magnetic disk, optical disk, read-only memory (ROM), or random-access memory (RAM). In an embodiment, security incident model 210 may be a machine learning model that is trained on a history of alerts that have been generated for one or more customers of a cloud security provider (including all customers). For example, as depicted in FIG. 2, model generator 204 includes a machine learning algorithm 208. Machine learning algorithm 202 is provided historical security incidents 202 as input, and is executed by model generator 204 to generate security incident model 210. Historical security incidents 202 may include a history of alerts in a cloud service, such as stored in alert logs generated by individual computing devices and/or servers connected to a cloud or environment 114 of FIG. 1 or through logs aggregating a history of alerts across multiple computing devices and/or servers connected to the cloud or environment 114. Additional detail for generating model 210 is described with reference to FIG. 4, further below.

As shown in FIG. 2, security incident model 210 is deployed in alert sequence analyzer 212. Alert sequence analyzer 212 is configured to use security incident model 210 to identify security incidents corresponding to received alert sequences, where an identified security incident includes at least one alert missing from the corresponding received alert sequence. For example, as depicted in FIG. 2, alert sequence analyzer 212 receives alert sequence 218 (e.g., the alert sequence of [$104_a$, $104_b$, $104_c$] in FIG. 1), applies alert sequence 218 to security incident model 210, and receives an indication from security incident model 210 that alert sequence 218 corresponds to a security incident 228 (e.g., the security incident of [$104_a$, $104_b$, $104_m$, $104_c$] in FIG. 1) that includes at least one alert missing from alert sequence 218. In an embodiment, the indication from security incident model 210 may include security incident 228, and alert sequence analyzer 212 may compare the alerts of security incident 228 to alert sequence 218 to identify any alert missing from alert sequence 218 (e.g., alert $104_m$ in FIG. 1). As shown in FIG. 2, alert sequence analyzer 212 is further configured to generate and provide a security incident indication 222 specifying security incident 228, and/or any alert(s) missing from alert sequence 218 that is/are present in security incident 228, to missing alert notification generator 216.

Missing alert notification generator 216 is configured to generate a notification based on security incident indication 222 received from alert sequence analyzer 212. For example, as shown in FIG. 2, missing alert notification generator 216 generates notification 220, which may be provided to a user (e.g., user 108 in FIG. 1), which may be a system administrator, a computer user, etc. In an embodiment, notification 220 may indicate all the alerts of security incident 228, and may identify security incident 228 by a name or other label, that corresponds to the alerts of alert sequence 218 and any missing alerts determined by alert sequence analyzer 212. Alternatively, in an embodiment, notification 220 may only indicate alerts missing from alert sequence 218 and not all the alerts included in security incident 228. As described previously, alerts contain valuable information helpful in investigating an attack. Notification 220 may also include such information (e.g., as identifying a resource that was attacked, a description of attack, a level of seriousness of attack, a time of detection, any action taken to address an attack, remediation steps, etc.).

Figure 3:
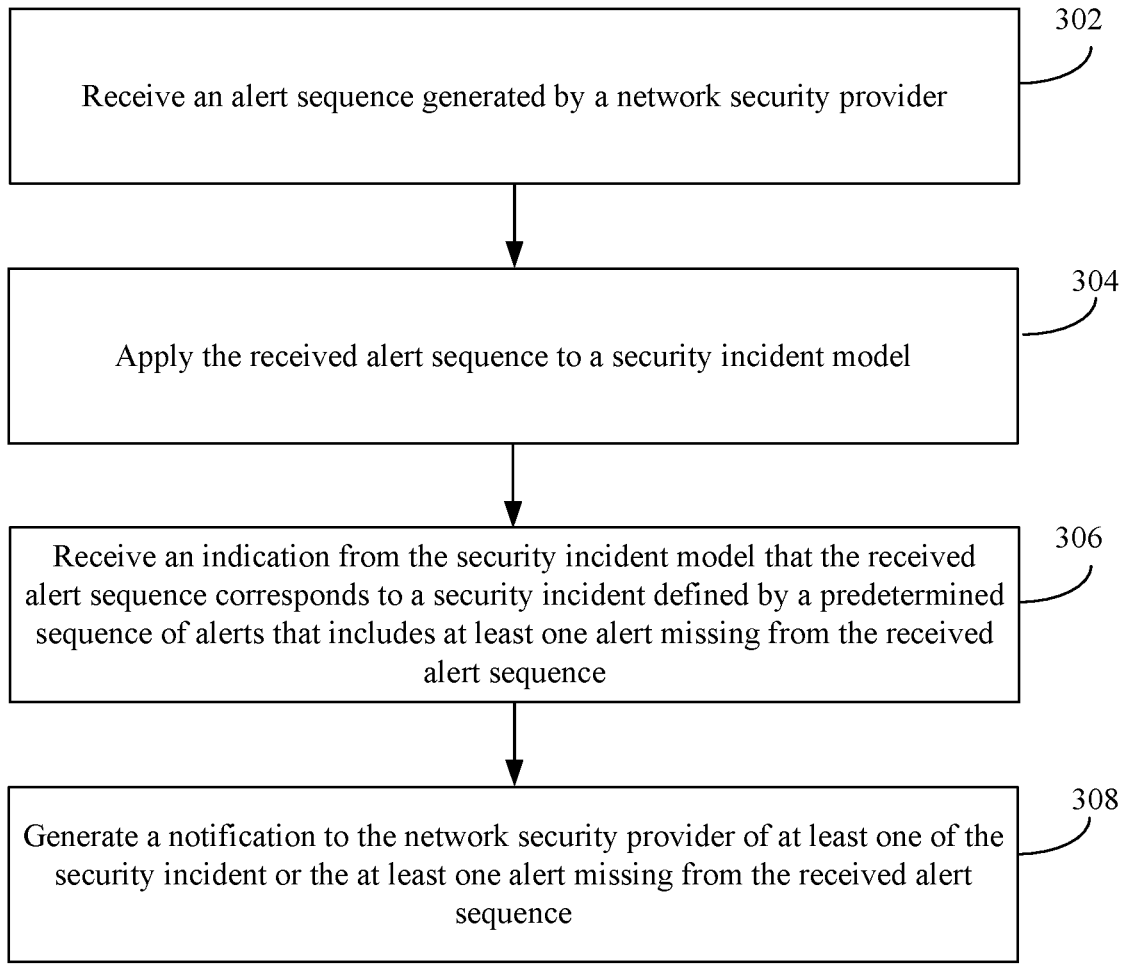
FIG. 3 shows a flowchart providing a process for determining that a received alert sequence corresponds to a security incident defined by a predetermined sequence of alerts that includes at least one alert missing from the received alert sequence, according to an example embodiment.

As described above, incident identification system 102 of FIG. 1 and FIG. 2 may operate in various ways. For instance, FIG. 3 shows a flowchart 300 for determining that a received alert sequence corresponds to a security incident defined by a predetermined sequence of alerts that includes at least one alert missing from the received alert sequence, according to an example embodiment. In an embodiment, flowchart 300 may be implemented by alert sequence analyzer 212 of FIG. 2. Other structural and operational embodiments will be apparent to persons skilled in the relevant art(s) based on the following discussion regarding flowchart 300.

Flowchart 300 begins with step 302. In step 302, an alert sequence generated by a network security provider is received. For example, with reference to FIG. 2, alert sequence analyzer 212 receives alert sequence 218. In an embodiment, as described herein with reference to FIG. 1 and continued reference to FIG. 2, alert sequence analyzer 212 may receive a security incident (e.g., an alert sequence of [$104_a$, $104_b$, $104_c$] in FIG. 1) from security management system 116 and/or may receive alerts (e.g., $104_a$, $104_b$, $104_c$ in FIG. 1) directly from resources of environment 114.

In step 304, the received alert sequence is applied to a security incident model. For example, with reference to FIG. 2, alert sequence analyzer 212 applies alert sequence 218 to security incident model 210 deployed at alert sequence analyzer 212. More specifically, alert sequence analyzer 212 provides alert sequence 218 to security incident model 210, and security incident model 210 generates an indication that received alert sequence 218 corresponds to security incident 228, which is defined by a predetermined sequence of alerts and includes at least one alert missing from received alert sequence 218. As previously described, the predetermined sequence of alerts may be a pattern of alerts previously detected and connected to a same attack campaign. Moreover, in embodiments, the indication generated by security incident model 210 may specify only security incident 228 or may specify security incident 228 and other security incidents that correspond to received alert sequence 218 and include at least one alert missing from alert sequence 218 to form security incident 228.

In step 306, an indication is received from the security incident model that the received alert sequence corresponds to a security incident defined by a predetermined sequence of alerts that includes at least one alert missing from the received alert sequence. For example, with reference to FIG. 2, alert sequence analyzer 212 receives the indication generated by security incident model 210 described above in step 304 from security incident model 210.

In step 308, a notification is generated to the network security provider, where the notification is of at least one of the security incident or the at least one alert missing from the received alert sequence. For example, with reference to FIG. 2, missing alert notification generator 216 generates notification 220 based on security incident indication 222 received from alert sequence analyzer 212. In an embodiment, notification 220 may include all the alerts of security incident 228. Alternatively, notification 220 may include merely the alert(s) missing from alert sequence 218, and not the other alerts of security incident 228. Note that if alert sequence analyzer 212 does not determine a security incident from alert sequence 218, notification 220 may indicate that no security incident was identified. Missing alert notification generator 216 may provide notification 220 to a user of a compromised resource. Missing alert notification generator 216 may also provide notification 220 to security management system 116 in FIG. 1. Upon receiving notification 220, security management system 116 may consider security incident 228 in its correlation and analysis functions in order to improve its reporting and alerting of incidents.

Figure 4:
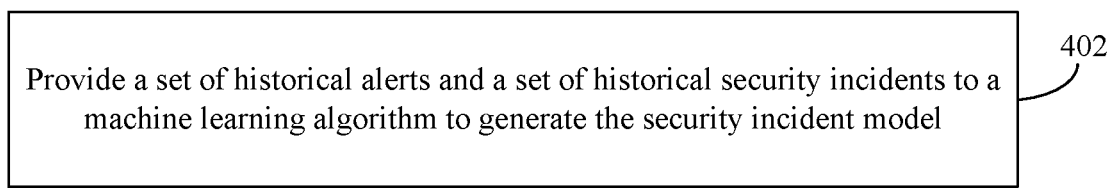
FIG. 4 shows a flowchart providing a process for generating a security incident model based on historical security incidents, according to another an example embodiment.

As previously described, security incident model 210 may be created by a training process involving providing a machine learning algorithm with training data to learn from. For instance, FIG. 4 shows a flowchart 400 for generating a security incident model based on historical security incidents, according to an example embodiment. In an embodiment, flowchart 400 may be implemented by model generator 204 of FIG. 2. Other structural and operational embodiments will be apparent to persons skilled in the relevant art(s) based on the following discussion regarding flowchart 400.

Flowchart 400 includes step 402. In step 402, a set of historical alerts and a set of historical security incidents is provided to a machine learning algorithm to generate the security incident model. For example, with reference to FIG. 2, after receiving historical security incidents 202, model generator 204 may provide historical security incidents 202 to machine learning algorithm 208. Model generator 204 may also include a machine learning (ML) application, such as TensorFlow™, that implements machine learning algorithm 208 to generate security incident model 210. When machine learning algorithm 208 is implemented, it may find patterns in the set of historical alerts, to map occurrences of the historical alerts to the historical security incidents 202, and output a model that captures these patterns to enable mapping of a received alert sequence to one or more security incidents previously known. Security incident model 210 may be generated using any suitable techniques, including supervised machine learning model generation algorithms such as supervised vector machines (SVM), linear regression, logistic regression, naïve Bayes, linear discriminant analysis, decision trees, k-nearest neighbor algorithm, neural networks, recurrent neural network, etc.

Note that security incident model 210 may be generated in various forms. In accordance with one embodiment, security incident model 210 may be generated according to a suitable supervised machine-learning algorithm mentioned elsewhere herein or otherwise known. For instance, model generator 204 may implement a vector space learning algorithm to generate security incident model 210 as a vector space model. As a vector space model, security incident model 210 would represent historical security incidents 202 in a continuous vector space, where similar security incidents are mapped to nearby points or are embedded nearby each other. With security incident model 210 in the form of a vector space model, many established natural language processing (NLP) methods can be used to predict and analyze relationships between security alerts, such as identifying missing alerts from a detected alert sequence. In another embodiment, model generator 204 may implement a gradient boosted tree algorithm or other decision tree algorithm to generate and/or train security incident model 210 in the form of a decision tree. The decision tree may be traversed with input data (alert sequence 218, etc.) to identify any missing alerts. Alternatively, model generator 204 may implement an artificial neural network learning algorithm to generate security incident model 210 as a neural network that is an interconnected group of artificial neurons. The neural network may be presented with an alert sequence to identify a security incident that the alert sequence corresponds to.

Figure 5:
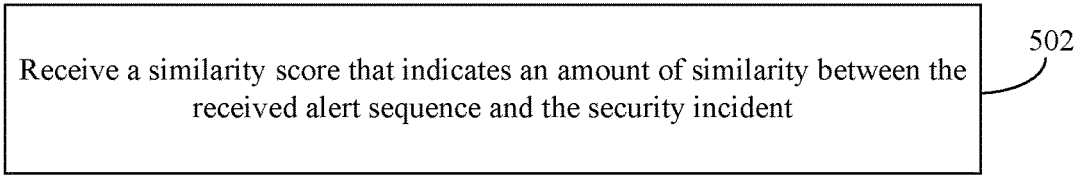
FIG. 5 shows a flowchart providing a process for obtaining a similarity score that indicates an amount of similarity between a received alert sequence and a security incident, according to an example embodiment.

In addition to security incident model 210 providing an indication that a received alert sequence corresponds to a security incident, security incident model 210 may also be configured to generate a similarity score that indicates an amount of similarity between the received alert sequence and the security incident. For instance, FIG. 5 shows a flowchart 500 for generating and receiving a similarity score that indicates an amount of similarity between a received alert sequence and a security incident, according to an example embodiment. In an embodiment, flowchart 500 may be implemented by alert sequence analyzer 212 of FIG. 2. Other structural and operational embodiments will be apparent to persons skilled in the relevant art(s) based on the following discussion regarding flowchart 500.

Flowchart 500 includes step 502. In step 502, a similarity score is received that indicates an amount of similarity between the received alert sequence and the security incident. For example, with reference to FIG. 2, alert sequence analyzer 212 may receive from security incident model 210 a similarity score that indicates an amount of similarity between received alert sequence 218 and security incident 228. For example, model generator 204 may generate security incident model 210 to include a weighted equation that includes a set of weighted variable that are combined (e.g., summed) to generate the similarity score. For instance, in one embodiment, each variable may correspond to an alert. If an alert is present in alert sequence 218, the variable for that alert may be given the value "1" (otherwise is given the value "0"). Each variable with value "1" is multiplied by its corresponding weight (determined by model generator 204), and each of these factors are combined to determine the similarity factor for that alert sequence, which may be compared to a standard factor for the determined security incident, to determine the similarity score (e.g., the closer the values of the factors, the higher the similarity score).

Alert sequence analyzer 212 is further configured to generate a similarity result 224 that identifies security incident 228 and the corresponding similarity score to similarity score comparator 214. In another embodiment, similarity result 224 may identify one or more alerts of security incident 228 that are missing from received alert sequence 218 and the corresponding similarity score.

Similarity score comparator 214 is also configured to provide a compare result 226 to missing alert notification generator 216 that identifies security incident 228 or the one or more alerts of security incident 228 that are missing from received alert sequence 218 and the corresponding similarity score. However, based on the similarity score specified in similarity result 224 received from alert sequence analyzer 212, similarity score comparator 214 may not propagate compare result 226 to missing alert notification generator 216. For example, similarity score comparator 214 may only provide compare result 226 identifying security incident 228 to missing alert notification generator 216 if the similarity score is above a predefined threshold.

Figure 6:
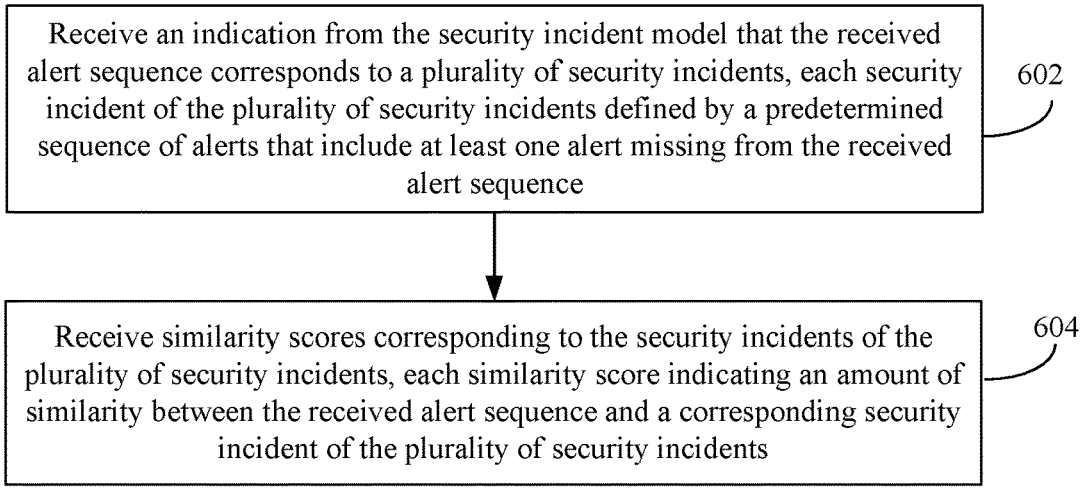
FIG. 6 shows a flowchart providing a process for obtaining an indication that a received alert sequence corresponds to a plurality of security incidents, according to an example embodiment.

In some embodiments, several security incidents may be identified as corresponding to received alert sequence 218. For instance, FIG. 6 shows a flowchart 600 for receiving an indication that a received alert sequence corresponds to a plurality of security incidents, according to an example embodiment. In an embodiment, flowchart 600 may be implemented by alert sequence analyzer 212 of FIG. 2. Other structural and operational embodiments will be apparent to persons skilled in the relevant art(s) based on the following discussion regarding flowchart 600.

Flowchart 600 begins with step 602. In step 602, an indication is received from the security incident model that the received alert sequence corresponds to a plurality of security incidents, where each security incident of the plurality of security incidents is defined by a predetermined sequence of alerts that include at least one alert missing from the received alert sequence. For example, with reference to FIG. 2, alert sequence analyzer 212 receives an indication from security incident model 210 that received alert sequence 218 corresponds to a plurality of security incidents (e.g., including security incident 228 and at least one other security incident identified by security incident model 210). Each security incident of the plurality of security incidents may be defined by a predetermined sequence of alerts that include at least one alert missing from received alert sequence 218.

In step 604, similarity scores corresponding to the security incidents of the plurality of security incidents are received. Each similarity score indicates an amount of similarity between the received alert sequence and a corresponding security incident of the plurality of security incidents. For example, with reference to FIG. 2, alert sequence analyzer 212 receives similarity scores corresponding to the security incidents of the plurality of security incidents. Each similarity score indicates an amount of similarity between received alert sequence 218 and a corresponding security incident of the plurality of security incidents.

Figure 7:
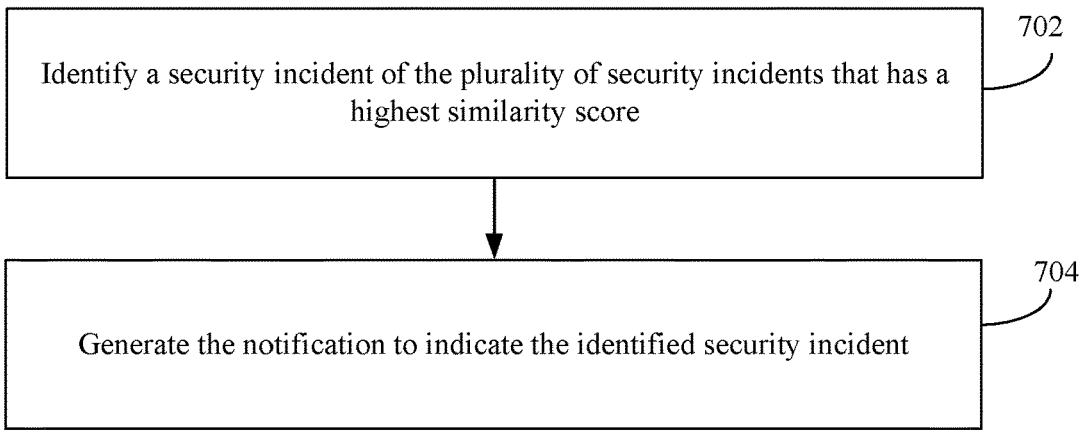
FIG. 7 shows a flowchart providing a process for identifying a security incident of a plurality of security incidents that has a highest similarity score, according to an example embodiment.

In an embodiment, in which several security incidents are identified as corresponding to received alert sequence 218, similarity score comparator 214 may be used to filter the several security incidents by their corresponding similarity scores. For instance, FIG. 7 shows a flowchart 700 for identifying a security incident of a plurality of security incidents that has a highest similarity score, according to an example embodiment. In an embodiment, flowchart 700 may be implemented by similarity score comparator 214 and missing alert notification generator 216 of FIG. 2. Other structural and operational embodiments will be apparent to persons skilled in the relevant art(s) based on the following discussion regarding flowchart 700.

Flowchart 700 begins with step 702. In step 702, a security incident of the plurality of security incidents that has a highest similarity score is identified. For example, with reference to FIG. 2, similarity score comparator 214 may receive similarity result 224 from alert sequence analyzer 212 identifying a plurality of security incidents (e.g., including security incident 228 and at least one other security incident identified by security incident model 210) that received alert sequence 218 corresponds to. Similarity score comparator 214 may compare the similarities scores of the plurality of security incidents and provide compare result 226 to missing alert notification generator 216 indicating which security incident of the plurality of security incidents has the highest similarity score.

In step 704, the notification to indicate the identified security incident is generated. For example, with reference to FIG. 2, missing alert notification generator 216 may generate notification 220 to indicate which security incident of the plurality of security incidents has the highest similarity score.

Figure 8:
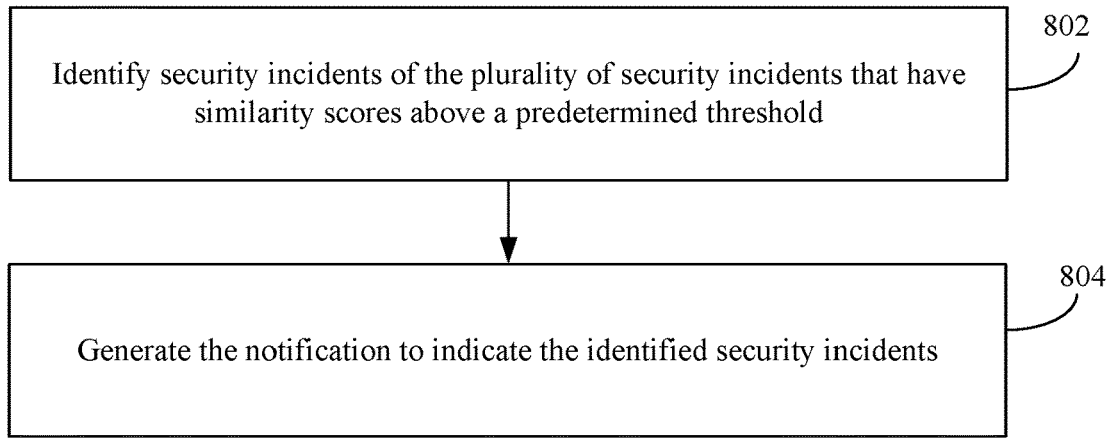
FIG. 8 shows a flowchart providing a process for identifying security incidents of the plurality of security incidents that have similarity scores above a predetermined threshold, according to an example embodiment.

In some embodiments, missing alert notification generator 216 may generate a notification to a network security provider reporting that several security incidents correspond to a received alert sequence. For instance, FIG. 8 shows a flowchart 800 for identifying security incidents of the plurality of security incidents that have similarity scores above a predetermined threshold, according to an example embodiment. In an embodiment, flowchart 800 may be implemented by similarity score comparator 214 and missing alert notification generator 216 of FIG. 2. Other structural and operational embodiments will be apparent to persons skilled in the relevant art(s) based on the following discussion regarding flowchart 800.

Flowchart 800 begins with step 802. In step 802, security incidents of the plurality of security incidents that have similarity scores above a predetermined threshold are identified. For example, with reference to FIG. 2, similarity score comparator 214 may receive similarity result 224 from alert sequence analyzer 212 identifying a plurality of security incidents (e.g., including security incident 228 and at least one other security incident identified by security incident model 210) that received alert sequence 218 corresponds to. Similarity score comparator 214 may compare the similarities scores of the plurality of security incidents and provide compare result 226 to missing alert notification generator 216 indicating which security incidents of the plurality of security incidents have similarity scores above the predetermined threshold. The predetermined threshold may be determined by a system administrator.

In step 804, the notification to indicate the identified security incidents is generated. For example, with reference to FIG. 2, missing alert notification generator 216 may generate notification 220 to indicate which security incidents of the plurality of security incidents have similarity scores above the predetermined threshold.

Figure 9:
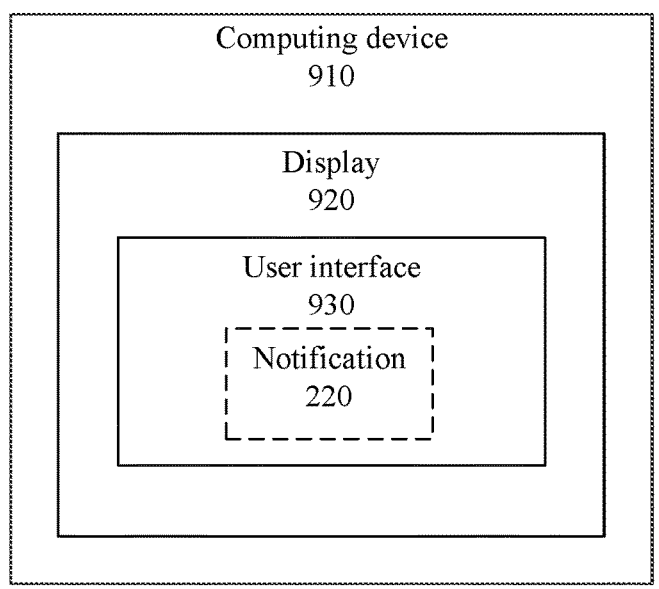
FIG. 9 shows an exemplary user interface for providing a notification of a security incident to a system administrator or other user, according to an example embodiment.

As previously described, in an embodiment, notification 220 may be provided to a user such as a system administrator. For instance, FIG. 9 shows computing device 910, which may be used by a system administrator in charge of managing and/or monitoring the security of any of resources in 106A, 106B, 106C, and 106D in environment 114 in FIG. 1. In this example, computing device 910 may contain a display 920, which may be any suitable display, such as a liquid crystal display, cathode ray tube display, light-emitting diode display, or any other type of display connectable to computing device 910. Display 920 may be external to or incorporated in computing device 910. Display 920 may contain a user interface 930 (e.g., a graphical user interface) that displays, among other things, information to a system administrator regarding the security of any of resources in 106A, 106B, 106C, and 106D in environment 114. In an embodiment, notification 220 may be displayed on user interface 930 of computing device 910. Computing device 910 may also include other peripheral output devices (not shown) such as speakers and printers. In another embodiment, incident indication may be transmitted to any such peripheral device attached to computing device 910.

Notification 220 indicating all the alerts of security incident 228 of FIG. 2 may be displayed to a user of computing device 910. Alternatively, in an embodiment, notification 220 may only indicate alerts missing from alert sequence 218 and not all the alerts included in security incident 228 of FIG. 2. Notification 220 may also include information helpful to the user of computing device 910 in investigating an attack. For example, notification 220 indicating such information, such as identifying a resource that was attacked, a description of attack, a level of seriousness of attack, a time of detection, any action taken to address an attack, remediation steps, etc., may be displayed to the user of computing device 910.

III. Example Computer System Implementation

Incident identification system 102, security management system 116, model generator 204, machine learning algorithm 208, alert sequence analyzer 212, similarity score comparator 214, missing alert notification generator 216, flowchart 300, flowchart 400, flowchart 500, flowchart 600, flowchart 700 and/or flowchart 800 may be implemented in hardware, or hardware combined with one or both of software and/or firmware. For example, incident identification system 102, security management system 116, model generator 204, machine learning algorithm 208, alert sequence analyzer 212, similarity score comparator 214, missing alert notification generator 216, flowchart 300, flowchart 400, flowchart 500, flowchart 600, flowchart 700 and/or flowchart 800 may be implemented as computer program code/instructions configured to be executed in one or more processors and stored in a computer readable storage medium. In another embodiment, incident identification system 102, security management system 116, model generator 204, machine learning algorithm 208, alert sequence analyzer 212, similarity score comparator 214, missing alert notification generator 216, flowchart 300, flowchart 400, flowchart 500, flowchart 600, flowchart 700 and/or flowchart 800 may also be implemented in hardware that operates software as a service (SaaS) or platform as a service (PaaS). Alternatively, incident identification system 102, security management system 116, model generator 204, machine learning algorithm 208, alert sequence analyzer 212, similarity score comparator 214, missing alert notification generator 216, flowchart 300, flowchart 400, flowchart 500, flowchart 600, flowchart 700 and/or flowchart 800 may be implemented as hardware logic/electrical circuitry.

For instance, in an embodiment, one or more, in any combination, of incident identification system 102, security management system 116, model generator 204, machine learning algorithm 208, alert sequence analyzer 212, similarity score comparator 214, missing alert notification generator 216, flowchart 300, flowchart 400, flowchart 500, flowchart 600, flowchart 700 and/or flowchart 800 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
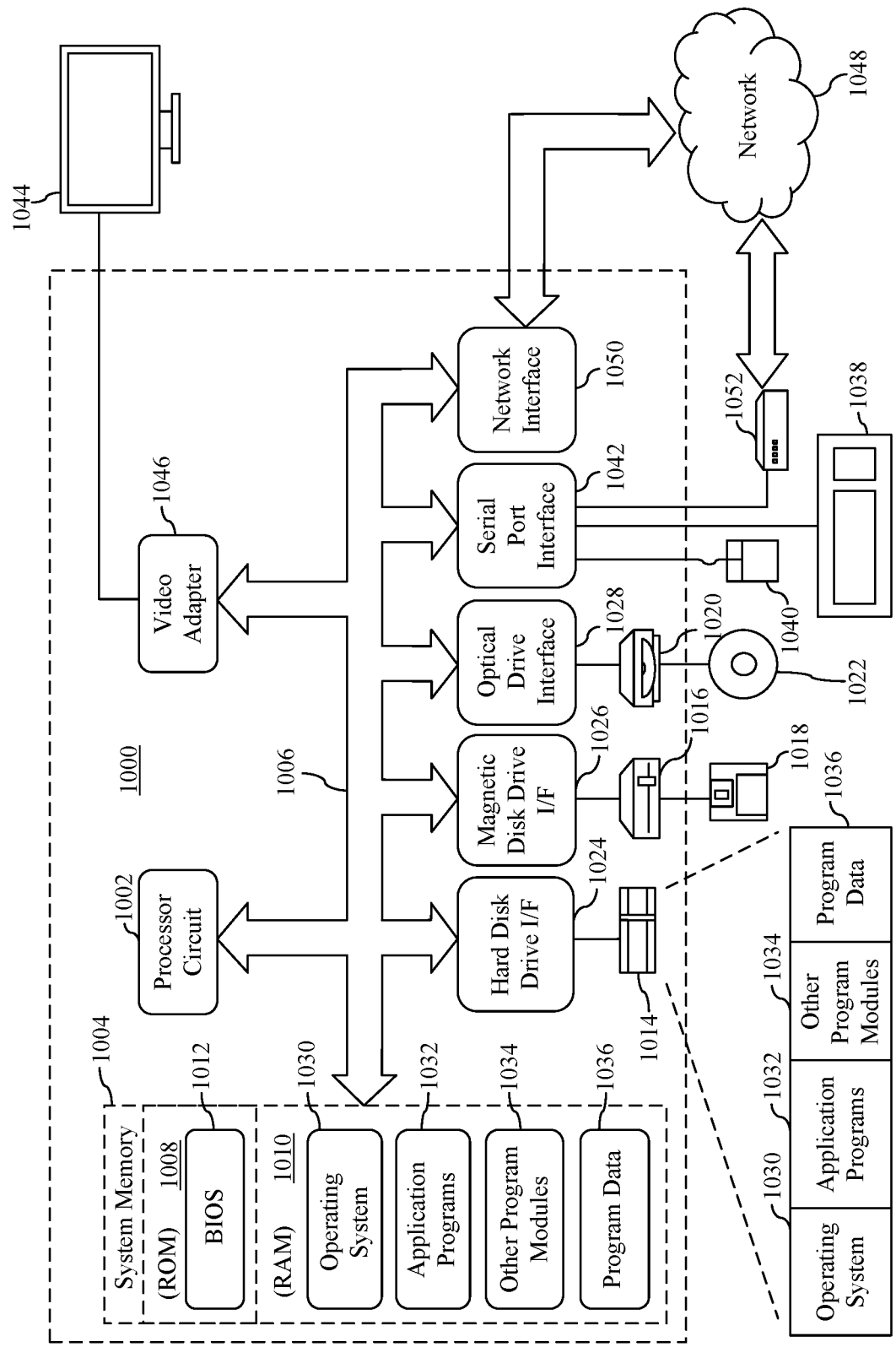
FIG. 10 is a block diagram of an example processor-based computer system that may be used to implement various embodiments.

FIG. 10 depicts an exemplary implementation of a computing device 1000 in which embodiments may be implemented. For example, components of system 100 and system 200 may each be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing incident identification system 102, security management system 116, model generator 204, machine learning algorithm 208, alert sequence analyzer 212, similarity score comparator 214, missing alert notification generator 216, flowchart 300, flowchart 400, flowchart 500, flowchart 600, flowchart 700 and/or flowchart 800 (including any suitable step of flowcharts 200, 400, 500, 600, 700, and 800), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers. Display screen 1044, and/or any other peripheral output devices (not shown) may be used for implementing user interface 930, and/or any further embodiments described herein.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media).

Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system comprises: an alert sequence analyzer configured to receive an alert sequence generated by a network security provider, apply the received alert sequence to a security incident model, and receive an indication from the security incident model that the received alert sequence corresponds to a security incident defined by a predetermined sequence of alerts that includes at least one alert missing from the received alert sequence; and a missing alert notification generator configured to generate a notification to the network security provider that indicates at least one of the security incident or the at least one alert missing from the received alert sequence.

In one embodiment of the foregoing system, the alert sequence analyzer is further configured to: receive a similarity score from the security incident model that indicates an amount of similarity between the received alert sequence and the security incident.

In another embodiment of the foregoing system, the notification includes the similarity score.

In another embodiment of the foregoing system, a model generator is configured to provide a set of historical alerts and a set of historical security incidents to a machine learning algorithm to generate the security incident model.

In another embodiment of the foregoing system, the alert sequence analyzer is further configured to: receive an indication from the security incident model that the received alert sequence corresponds to a plurality of security incidents, each security incident of the plurality of security incidents defined by a predetermined sequence of alerts that include at least one alert missing from the received alert sequence; and receive similarity scores corresponding to the security incidents of the plurality of security incidents, each similarity score indicating an amount of similarity between the received alert sequence and a corresponding security incident of the plurality of security incidents.

In another embodiment of the foregoing system, a similarity score comparator is configured to identify a security incident of the plurality of security incidents that has a highest similarity score; and the missing alert notification generator is further configured to generate the notification to indicate the identified security incident.

In another embodiment of the foregoing system, a similarity score comparator is configured to identify security incidents of the plurality of security incidents that have similarity scores greater than a predetermined threshold; and wherein the missing alert notification generator is further configured to generate the notification to indicate the identified security incidents.

A method comprises: receiving an alert sequence generated by a network security provider; applying the received alert sequence to a security incident model; receiving an indication from the security incident model that the received alert sequence corresponds to a security incident defined by a predetermined sequence of alerts that includes at least one alert missing from the received alert sequence; and generating a notification to the network security provider that indicates at least one of the security incident or the at least one alert missing from the received alert sequence.

In one embodiment of the foregoing method, said receiving an indication comprises: receiving a similarity score from the security incident model that indicates an amount of similarity between the received alert sequence and the security incident.

In another embodiment of the foregoing method, the method further comprises: using natural language processing methods to identify the at least one alert missing from the received alert sequence.

In another embodiment of the foregoing method, the method further comprises: providing a set of historical alerts and a set of historical security incidents to a machine learning algorithm to generate the security incident model.

In another embodiment of the foregoing method, said receiving an indication comprises: receiving an indication from the security incident model that the received alert sequence corresponds to a plurality of security incidents, each security incident of the plurality of security incidents defined by a predetermined sequence of alerts that include at least one alert missing from the received alert sequence; and receiving similarity scores corresponding to the security incidents of the plurality of security incidents, each similarity score indicating an amount of similarity between the received alert sequence and a corresponding security incident of the plurality of security incidents.

In another embodiment of the foregoing method, further comprises: identifying a security incident of the plurality of security incidents that has a highest similarity score; and said generating comprises: generating the notification to indicate the identified security incident.

In another embodiment of the foregoing method, further comprises: identifying security incidents of the plurality of security incidents that have similarity scores greater than a predetermined threshold; and said generating comprises: generating the notification to indicate the identified security incidents.

A computer-readable storage medium having program instructions recorded thereon that, when executed by at least one processing circuit, perform a method on a computing device, the method comprises: receiving an alert sequence generated by a network security provider; applying the received alert sequence to a security incident model; receiving an indication from the security incident model that the received alert sequence corresponds to a security incident defined by a predetermined sequence of alerts that includes at least one alert missing from the received alert sequence; and generating a notification to the network security provider that indicates at least one of the security incident or the at least one alert missing from the received alert sequence.

In one embodiment of the foregoing computer-readable storage medium, said receiving an indication comprises: receiving a similarity score from the security incident model that indicates an amount of similarity between the received alert sequence and the security incident.

In another embodiment of the foregoing computer-readable storage medium, the method comprises: providing a set of historical alerts and a set of historical security incidents to a machine learning algorithm to generate the security incident model.

In another embodiment of the foregoing computer-readable storage medium, said receiving an indication comprises: receiving an indication from the security incident model that the received alert sequence corresponds to a plurality of security incidents, each security incident of the plurality of security incidents defined by a predetermined sequence of alerts that include at least one alert missing from the received alert sequence; and receiving similarity scores corresponding to the security incidents of the plurality of security incidents, each similarity score indicating an amount of similarity between the received alert sequence and a corresponding security incident of the plurality of security incidents.

In another embodiment of the foregoing computer-readable storage medium, the method further comprises: identifying a security incident of the plurality of security incidents that has a highest similarity score; and said generating comprises: generating the notification to indicate the identified security incident.

In another embodiment of the foregoing computer-readable storage medium, the method further comprises: identifying security incidents of the plurality of security incidents that have similarity scores greater than a predetermined threshold; and said generating comprises: generating the notification to indicate the identified security incidents.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system comprising:
   at least one processor circuit; and
   at least one memory that stores instructions to be executed by the at least one processor circuit, the instructions configured to perform operations that comprise:
      providing a set of historical alerts and a set of historical security incidents to a machine learning algorithm to generate a security incident model, the security incident model generated based at least on mapping occurrences of alerts in the set of historical alerts to incidents in the set of historical incidents;
      receiving an alert sequence generated by a network security provider;
      applying the received alert sequence to the security incident model;
      receiving an indication from the security incident model that the received alert sequence corresponds to a plurality of security incidents, each security incident of the plurality of security incidents defined by a predetermined sequence of alerts that includes at least one alert missing from the received alert sequence;
      receiving similarity scores corresponding to the security incidents of the plurality of security incidents, each similarity score indicating an amount of similarity between the received alert sequence and a corresponding security incident of the plurality of security incidents;
      identifying a security incident of the plurality of security incidents that has a highest similarity score among the similarity scores; and
      generating a notification to the network security provider that indicates at least one of the identified security incident or the at least one alert of the identified security incident that is missing from the received alert sequence.

2. The system of claim 1, wherein the notification includes the similarity score associated with the identified security incident.

3. The system of claim 1, wherein the instructions are further configured to perform operations that comprise:
   identifying security incidents of the plurality of security incidents that have similarity scores greater than a predetermined threshold; and
   wherein said generating comprises generating the notification to indicate the identified security incidents.

4. A method comprising:
   providing a set of historical alerts and a set of historical security incidents to a machine learning algorithm to generate a security incident model, the security incident model generated based at least on mapping occurrences of alerts in the set of historical alerts to incidents in the set of historical incidents;
   receiving an alert sequence generated by a network security provider;
   applying the received alert sequence to the security incident model;
   receiving an indication from the security incident model that the received alert sequence corresponds to a plurality of security incidents, each security incident of the plurality of security incidents defined by a predetermined sequence of alerts that includes at least one alert missing from the received alert sequence;
   receiving similarity scores corresponding to the security incidents of the plurality of security incidents, each similarity score indicating an amount of similarity between the received alert sequence and a corresponding security incident of the plurality of security incidents;
   identifying a security incident of the plurality of security incidents that has a highest similarity score among the similarity scores; and
   generating a notification to the network security provider that indicates at least one of the identified security incident or the at least one alert of the identified security incident that is missing from the received alert sequence.

5. The method of claim 4, further comprising:
   for each security incident of the plurality of security incidents defined by the predetermined sequence of alerts, identifying the at least one alert missing from the received alert sequence using natural language processing.

6. The method of claim 4, further comprising:
   identifying security incidents of the plurality of security incidents that have similarity scores greater than a predetermined threshold; and
   wherein said generating comprises:
      generating the notification to indicate the identified security incidents.

7. A computer program product comprising a computer-readable memory having program instructions recorded thereon that, when executed by at least one processing circuit, causes the at least one processing circuit to perform the steps of:

providing a set of historical alerts and a set of historical security incidents to a machine learning algorithm to generate a security incident model, the security incident model generated based at least on mapping occurrences of alerts in the set of historical alerts to incidents in the set of historical incidents;

receiving an alert sequence generated by a network security provider;

applying the received alert sequence to the security incident model;

receiving an indication from the security incident model that the received alert sequence corresponds to a plurality of security incidents, each security incident of the plurality of security incidents defined by a predetermined sequence of alerts that includes at least one alert missing from the received alert sequence;

receiving similarity scores corresponding to the security incidents of the plurality of security incidents, each similarity score indicating an amount of similarity between the received alert sequence and a corresponding security incident of the plurality of security incidents;

identifying security incidents of the plurality of security incidents that have similarity scores greater than a predetermined threshold; and generating a notification to the network security provider that indicates at least one of the identified security incidents or the at least one alert of each of the identified security incidents that is missing from the received alert sequence.

8. The system of claim 1, wherein the predetermined sequence of alerts comprises a pattern of alerts corresponding to steps in an attack campaign.

9. The method of claim 4, wherein the predetermined sequence of alerts comprises a pattern of alerts corresponding to steps in an attack campaign.

10. The computer program product of claim 7, wherein the predetermined sequence of alerts comprises a pattern of alerts corresponding to steps in an attack campaign.

11. The computer program product of claim 7, wherein: the method further comprises:

identifying a security incident of the identified security incidents that has a highest similarity score; and said generating comprises:

generating the notification to indicate the identified security incident.

12. The system of claim 1, wherein the instructions are further configured to perform operations that comprise:

for each security incident of the plurality of security incidents defined by the predetermined sequence of alerts, identifying the at least one alert missing from the received alert sequence using natural language processing.

13. The system of claim 1, wherein the set of historical alerts comprises a history of alerts generated for a plurality of customers of a cloud security provider.

14. The system of claim 1, wherein the security incident model is generated based at least on:

identifying patterns in the set of historical alerts.

15. The method of claim 4, wherein the notification includes the similarity score associated with the identified security incident.

16. The method of claim 4, wherein the set of historical alerts comprises a history of alerts generated for a plurality of customers of a cloud security provider.

17. The method of claim 4, wherein the security incident model is generated based at least on:

identifying patterns in the set of historical alerts.

18. The computer program product of claim 7, wherein the method further comprises:

for each security incident of the plurality of security incidents defined by the predetermined sequence of alerts, identifying the at least one alert missing from the received alert sequence using natural language processing.

19. The computer program product of claim 7, wherein the notification includes the similarity scores associated with the identified security incidents.

20. The computer program product of claim 7, wherein the set of historical alerts comprises a history of alerts generated for a plurality of customers of a cloud security provider.

* * * * *